United States Patent [19]

Seo et al.

[11] Patent Number: 5,676,902
[45] Date of Patent: Oct. 14, 1997

[54] PROCESS FOR THE PREPARATION OF THERMOPLASTIC RESIN FILM

[75] Inventors: Jeong-Wook Seo, Suwon-si; Wan-Sup Shim, Kwachun-si; Young-Jin Lee, Anyang-si, all of Rep. of Korea

[73] Assignee: SKC Limited, Kyung Ki-Do, Rep. of Korea

[21] Appl. No.: 498,557

[22] Filed: Jul. 5, 1995

[30] Foreign Application Priority Data

Jul. 4, 1994 [KR] Rep. of Korea ............ 94-15897

[51] Int. Cl.$^6$ .................................................. B29C 55/14
[52] U.S. Cl. .................................... 264/290.2; 264/346
[58] Field of Search .................... 264/235.8, 290.2, 264/346

[56] References Cited

U.S. PATENT DOCUMENTS

| | | | |
|---|---|---|---|
| 5,085,933 | 2/1992 | Katoh et al. | 428/332 |
| 5,366,685 | 11/1994 | Fujii et al. | 264/547 |
| 5,411,695 | 5/1995 | Yamada et al. | 264/235.8 X |

FOREIGN PATENT DOCUMENTS

| | | |
|---|---|---|
| 39-29214 | 12/1964 | Japan . |
| 42-9273 | 5/1967 | Japan . |
| 50-73978 | 6/1975 | Japan . |
| 61-8324 | 1/1986 | Japan . |
| 62-183327 | 8/1987 | Japan . |
| 62-183328 | 8/1987 | Japan . |
| 63-24459 | 5/1988 | Japan . |
| 1-204723 | 8/1989 | Japan . |
| 3-130126 | 6/1991 | Japan . |
| 3-130127 | 6/1991 | Japan . |
| 4-142916 | 5/1992 | Japan . |
| 4-142917 | 5/1992 | Japan . |

*Primary Examiner*—Leo B. Tentoni
*Attorney, Agent, or Firm*—Anderson Kill & Olick, P.C.

[57] ABSTRACT

A process for preparing a thermoplastic resin film having uniform physical and chemical properties includes extending a thermoplastic resin sheet in a longitudinal direction so that the crystallization energy of the longitudinally extended sheet is 20 J/g or more to give a longitudinally extended sheet, extending the longitudinally extended sheet in a transverse direction to give a biaxially extended film, and heat treating the biaxially extended film to give the resin film.

2 Claims, 1 Drawing Sheet

PROCESS FOR THE PREPARATION OF THERMOPLASTIC RESIN FILM

FIELD OF THE INVENTION

The present invention relates to a process for the preparation of a thermoplastic resin film having uniform physical and chemical properties by controlling the bowing of the film during a transverse extension and heat treating step.

BACKGROUND OF THE INVENTION

Thermoplastic resin films, especially those prepared from polyesters, have been widely used as condensers, packaging and labelling materials, photographic films, magnetic recording media and the like. For such various applications, it is desired that they have uniform physical and chemical properties in their transverse direction. When such film properties as heat shrinkage, mechanical strength and density are not uniform in the transverse direction, various difficulties are likely to occur in the further processing of the film, such as coating, deposition, slitting or printing, thereby deteriorating the quality of the film product. Therefore, numerous attempt have been made to produce a film having uniform physical and chemical properties in the transverse direction.

Thermoplastic resin films are generally prepared by a process of melt-extruding a thermoplastic polymer chip into an amorphous sheet, extending the sheet in longitudinal and transverse directions and then heat treating the extended film. In the process, the transverse extension and heat treating is carried out in a tenter and plays a critical role in maintaining the uniformity of the film properties in the transverse direction. In producing a film in accordance with the conventional methods, "bowing" of film tends to occur during the transverse extension and heat treating, which may cause a non-uniformity in the transverse directional properties thereof.

Said bowing refers to a phenomenon caused by a difference in the deformation between both edges and the center of the film being processed. That is, after a longitudinal extension, the film is extended along the transverse direction with its both edges held by, e.g., clips, and then heat treated. During the transverse extension and heat treatment, therefore, the edge areas of the film remain essentially intact due to the stability force of the clips, while the center of the film may be greatly deformed. Such difference in the degree of deformation depending on the transverse location of the film causes a bowing effect.

FIG. 1 shows such bowing effect of a film being heat treated in a tenter. In FIG. 1, b shows the extent of the deformation, W is the width of the film (F), and the arrow means the proceeding direction of the film.

Consequently, extensive attempts have been made to prevent the bowing. For example, Japanese Patent Publication No. 64-29214 describes a heat treatment by the use of heating rolls. In accordance with the process, however, both edges of the film are heat treated by heating rolls which are not firmly fixed or stabilized, thereby causing a shrinkage in the transverse direction.

Japanese Patent Publication No. 67-9273 discloses a process of heat treating a film under a temperature gradient in the transverse direction; and Japanese Patent Laid-open Publication Nos. 87-183327 and 183328 offer the method of heat treating a film with a heating gas, the flow rate (or amount) of which is different in the transverse direction. However, these methods have the disadvantages that require the use of complicated equipment and a substantial period for adjusting the conditions.

Japanese Patent Laid-open Publication No. 75-73978 presents a method including an additional heat treatment of a film with nip rolls between the transverse extending process and the heat treating process; and Japanese Patent Publication No. 88-24459 describes a method of heat treating while the center of the film is proceeded forcibly by nip rolls. These methods, however, have the disadvantages that the film may be damaged by the contact with the hot rolls.

Japanese Patent Laid-open Publication Nos. 91-130126, 91-130127, 92-142916 and 92-142917 disclose methods of inserting a cooling process after the transverse extension. These methods have limited effect, if any, while requiring the use of an additional apparatus.

Moreover, Japanese Patent Laid-open Publication Nos. 86-8324 and 89-204723 describe methods of an additional heat treatment of a film after the transverse extension in a tenter. However, these methods have the problem that the difference in the degree of deformation in the transverse direction is not lowered since the heat treatment is carried out through the whole width of the film.

SUMMARY OF THE INVENTION

It is, therefore, a primary object of the present invention to provide a process for preparing a thermoplastic resin film having uniform physical and chemical properties in its transverse direction.

In accordance with the present invention, there is provided a process for preparing a thermoplastic resin film which comprises extending a thermoplastic resin sheet in a longitudinal direction so that the crystallization energy of the longitudinally extended sheet is 20 J/g or more to give a longitudinally extended sheet, extending the longitudinally extended sheet in a transverse direction to give a biaxially extended film, and heat treating the biaxially extended film to give the resin film.

DETAILED DESCRIPTION OF THE INVENTION

Figure 1:
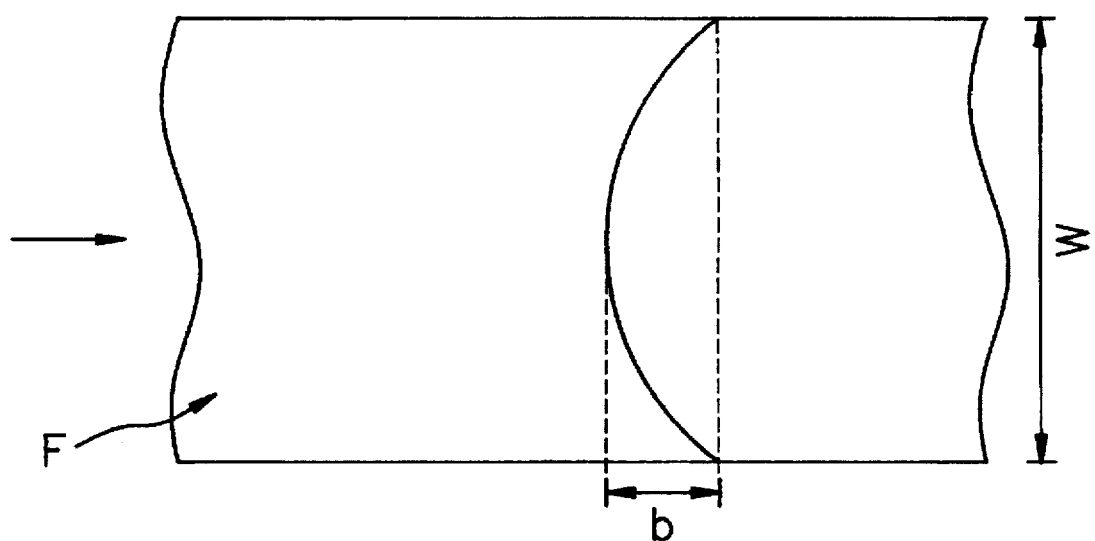
FIG. 1 shows a bowing effect of a film which occurs during a heat treating process.

The characteristic feature of the present invention is that a thermoplastic resin sheet is extended in a longitudinal direction so that the crystallization energy of the longitudinally extended sheet is 20 J/g or more. In case that the sheet is longitudinally extended in that manner, the degree of the crystallization and orientation of the sheet is lowered and the longitudinal contraction stress decreases, thereby reducing the bowing effect.

The crystallization energy of the longitudinally extended sheet may be increased to 20 J/g or more by way of increasing the temperature of the longitudinal extension to 120° C. or more, decreasing the draw ratio in a longitudinal direction to 3.5 or less, and/or controlling the speed of a film formation to 300 m/min or less. Among those methods, preferred is a method of increasing the longitudinal extension temperature and/or of decreasing the draw ratio in a longitudinal direction.

The longitudinally extended sheet in accordance with the present invention has preferably the crystallization energy ranging from 20 to 23 J/g.

The preferred draw ratio in a longitudinal direction ranges from 3.0 to 3.5; and the longitudinal extension is preferably carried out at a temperature ranging from 120° to 130° C. and a speed ranging from 200 to 280 m/min.

Representative thermoplastic resins which may be applicable to the present invention include homopolyesters, copolyesters or mixed polyesters. Especially preferred are such polyesters as polyethylene terephthalate, polyethylene-2,6-naphthalate, polytetramethylene terephthalate, polytetramethylene-2,6-naphthalene carboxylate, liquid crystalline polyester, polypropylene, polyvinyl chloride, nylon, polyimide and polyphenylenesulfite.

The following Examples are intended to illustrate the present invention more specifically, without limiting the scope of the invention.

In the Examples and Comparative Examples, the properties of the thermoplastic resin film were evaluated in accordance with the following methods.

The crystallization energy of the longitudinally extended sheet was measured by using a differential scanning calorimeter (DSC, Perkin-Elmer Company) at a temperature increase ratio of 20° C./min.

The amount of bowing was calculated as follows:

$$B = b/W \times 100(\%)$$

wherein:

B is the amount of bowing (%);

b is the distance from the base line to the peak of the bow shape (mm); and

W is the width of the film (mm).

The variation of specific gravity of the film along the transverse direction was estimated in accordance with the following formula. The specific gravity was measured using a density gradient column method under the condition of ASTM D1505:

$$\frac{\text{variation of specific gravity in transverse direction of the film}}{} = \frac{\text{(maximum-minimum) of specific gravity in transverse direction}}{\text{average value of specific gravity in transverse direction}} \times 100$$

The variation of thickness of the film along the transverse direction was estimated in accordance with the following formula. The thickness of the film was measured using a thickness measuring instrument from Winzen, U.S.A.:

$$\frac{\text{variation of thickness in transverse direction of the film}}{} = \frac{\text{(maximum-minimum) of thickness in transverse direction}}{\text{average value of thickness in transverse direction}} \times 100$$

EXAMPLE 1

A 1:1 mixture of dimethyl terephthalate and ethyleneglycol was transesterified according to a conventional method to give a bis-2-hydroxyethylterephthalate. The monomer was polycondensed to give a polyethylene terephthalate polymer chip having an intrinsic viscosity of 0.64 dl/g. The polyester chip was melt-extruded at 290° C. and quenched on a cooling roll at 20° C. to form an amorphous sheet having a thickness of 200 μm in a speed of 70 m/min. The amorphous sheet was extended in a draw ratio of 3.5 in a longitudinal direction at an elevated temperature 130° C. with infrared heaters, each having three components with a diameter of 20 mm, an electrical power of 20 kW and a surface temperature of 900° C., which are located over and under the sheet. The longitudinally extended sheet was extended in a ratio of 4.0 in a transverse direction and heat-treated at 220° C. to provide a biaxially oriented polyethylene terephthalate resin film having a thickness of 14 μm.

EXAMPLE 2

The procedure of Example 1 was repeated except that the surface temperature of the heater was 800° C. (longitudinal extension temperature was 123° C.) and the draw ratio in the longitudinal direction was 3.3 to provide a biaxially oriented polyethylene terephthalate resin film.

EXAMPLE 3

The procedure of Example 1 was repeated except that the surface temperature of the heater was 700° C. (longitudinal extension temperature was 120° C.) and the draw ratio in the longitudinal direction was 3.0 to provide a biaxially oriented polyethylene terephthalate resin film.

COMPARATIVE EXAMPLE 1

The procedure of Example 1 was repeated except that the draw ratio in the longitudinal direction was 3.7 to provide a biaxially oriented polyethylene terephthalate resin film.

COMPARATIVE EXAMPLE 2

The procedure of Example 1 was repeated except that the surface temperature of the heater was 800° C. (longitudinal extension temperature was 123° C.) to provide a biaxially oriented polyethylene terephthalate resin film.

COMPARATIVE EXAMPLE 3

The procedure of Example 1 was repeated except that the surface temperature of the heater was 700° C. (longitudinal extension temperature was 120° C.) and the draw ratio in the longitudinal direction was 3.3 to provide a biaxially oriented polyethylene terephthalate resin film.

The crystallization energy of the longitudinally extended sheet, the amount of bowing and variation of specific gravity and thickness in a transverse direction of each film were measured and the results were shown in Table 1.

TABLE 1

|  | crystallization energy of sheet (J/g) | amount of bowing (%) | variation of specific gravity in transverse direction (%) | variation of thickness in transverse direction (%) |
|---|---|---|---|---|
| EX. 1 | 22 | 3.3 | 0.06 | 2.8 |
| EX. 2 | 23 | 3.4 | 0.04 | 2.7 |
| EX. 3 | 21 | 3.6 | 0.05 | 2.3 |
| Com. EX. 1 | 13 | 5.5 | 0.1 | 3.5 |
| Com. EX. 2 | 15 | 5.0 | 0.1 | 3.0 |
| Com. EX. 3 | 11 | 5.1 | 0.09 | 2.9 |

As clearly shown in Table 1, the films prepared in Examples 1 to 3 show markedly reduced amounts of bowing and variations of specific gravity and thickness along the transverse directions. In contrast, the films prepared in Comparative Examples 1 to 3 show increased amounts of bowing and variations of specific gravity and thickness along the transverse directions since the draw ratio in longitudinal direction is high relative to the amount of heat applied in the longitudinal extension, or the amount of heat applied in the longitudinal extension is low, thereby decreasing the crystallization energy of the longitudinally extended sheet.

The biaxially extended thermoplastic resin films prepared in accordance with the inventive process have uniform physical and chemical properties such as specific gravity and thickness in the transverse direction.

While the invention has been described with respect to the above specific embodiment, it should be recognized that various modifications and changes may be made within the scope of the invention as defined by the claims that follow.

What is claimed is:

1. A process for preparing a thermoplastic resin film having uniform physical and chemical properties in a transverse direction which comprises extending a thermoplastic resin sheet in a longitudinal direction at a temperature ranging from 120° C. to 130° C., in a draw ratio ranging from 3.0 to 3.5 and at a film-forming speed ranging from 200 m/min to 280 m/min so that the crystallization energy of the longitudinally extended sheet is 20 J/g or more, extending the longitudinally extended sheet in the transverse direction to give a biaxially extended film, and heat treating the biaxially extended film to give the resin film.

2. The process of claim 1, wherein said crystallization energy of the longitudinally extended sheet ranges from 20 to 23 J/g.

* * * * *